United States Patent [19]
Meske

[11] Patent Number: 6,086,646
[45] Date of Patent: Jul. 11, 2000

[54] APPARATUS FOR STARTING A LOG FIRE

[76] Inventor: Albin F. Meske, 3232 N. Interloken Dr., Oconomowoc, Wis. 53066

[21] Appl. No.: 08/731,799

[22] Filed: Oct. 21, 1996

[51] Int. Cl.[7] .................................. C10L 5/44; C10L 5/00
[52] U.S. Cl. .................................. 44/532; 44/533; 44/590; 44/606
[58] Field of Search ............................. 44/532, 533, 535, 44/530, 590, 606

[56] References Cited

U.S. PATENT DOCUMENTS

| Re. 6,246 | 1/1875 | Husbands . | |
|---|---|---|---|
| 86,427 | 2/1869 | Loft . | |
| 135,385 | 2/1873 | Adams . | |
| 154,796 | 9/1874 | Husbands . | |
| 181,033 | 8/1876 | Brown . | |
| 182,087 | 9/1876 | Tylee . | |
| 182,287 | 9/1876 | Pond . | |
| 196,596 | 10/1877 | Reed . | |
| 196,918 | 10/1877 | McArthur . | |
| 199,184 | 1/1878 | Case . | |
| 201,184 | 3/1878 | Lewis . | |
| 211,085 | 1/1879 | Burnett . | |
| 248,849 | 10/1881 | Eddy . | |
| 317,420 | 5/1885 | Seymour . | |
| 345,928 | 7/1886 | Seymour . | |
| 348,326 | 8/1886 | Johns . | |
| 1,780,205 | 11/1930 | Maurel | 44/530 |
| 1,959,472 | 5/1934 | Heffernan, Jr. et al. | 44/530 |
| 2,578,998 | 12/1951 | Fracheboud . | |
| 3,726,651 | 4/1973 | Ronden | 44/535 |
| 4,326,854 | 4/1982 | Tanner | 44/590 |
| 4,818,249 | 4/1989 | Barrett, Jr. | 44/535 |
| 4,952,217 | 8/1990 | Porter . | |

*Primary Examiner*—Margaret Medley
*Attorney, Agent, or Firm*—Quarles & Brady

[57] ABSTRACT

A igniter for logs in a fireplace has a body of combustible material, such as wood, with two major surfaces. A plurality of grooves extend in one major surface thereby forming a plurality of ribs in the body. The grooves and ribs near the center of the body may be narrower than the grooves and ribs remote from the center. A slot extends in the other major surface transverse to the first direction wherein the slot communicates with plurality of grooves to form air passages through the body. A pair of blocks, placed on opposite sides of the slot, support the body above the fireplace hearth. By starting combustion beneath the slot in the body, a source of fire is provided that is concentrated initially into a relatively small area which gradually increases as the body is consumed.

15 Claims, 2 Drawing Sheets

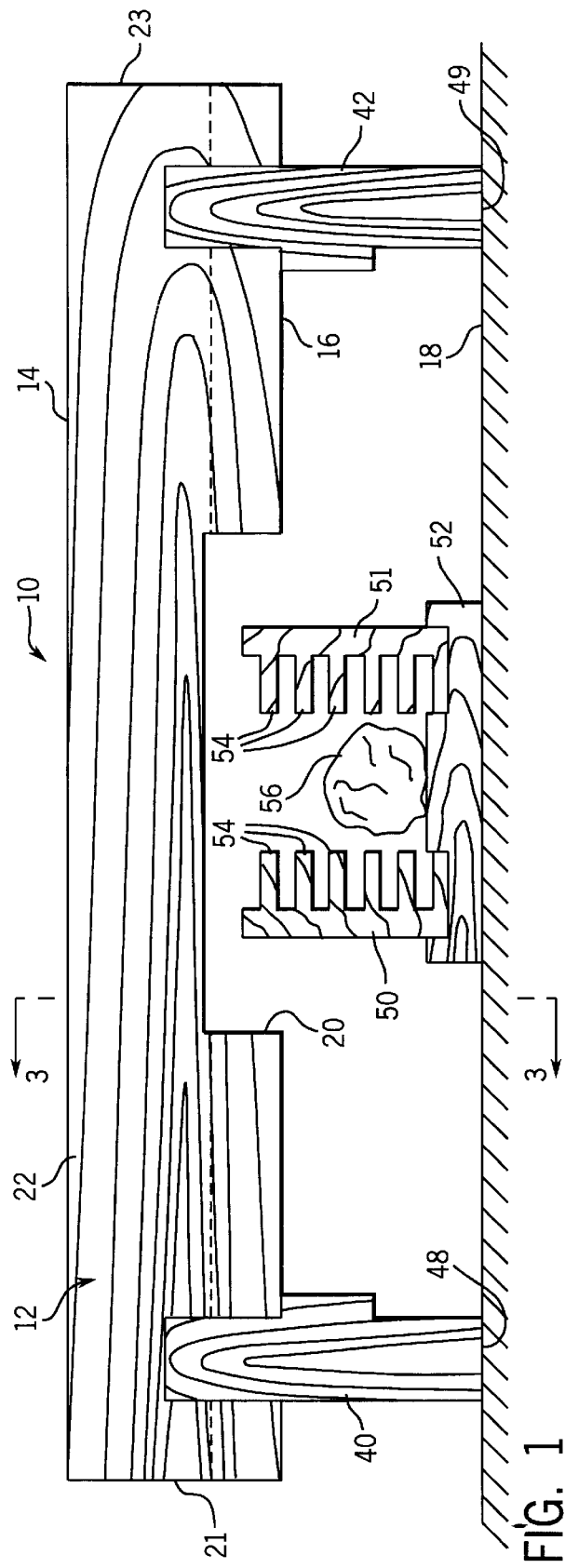
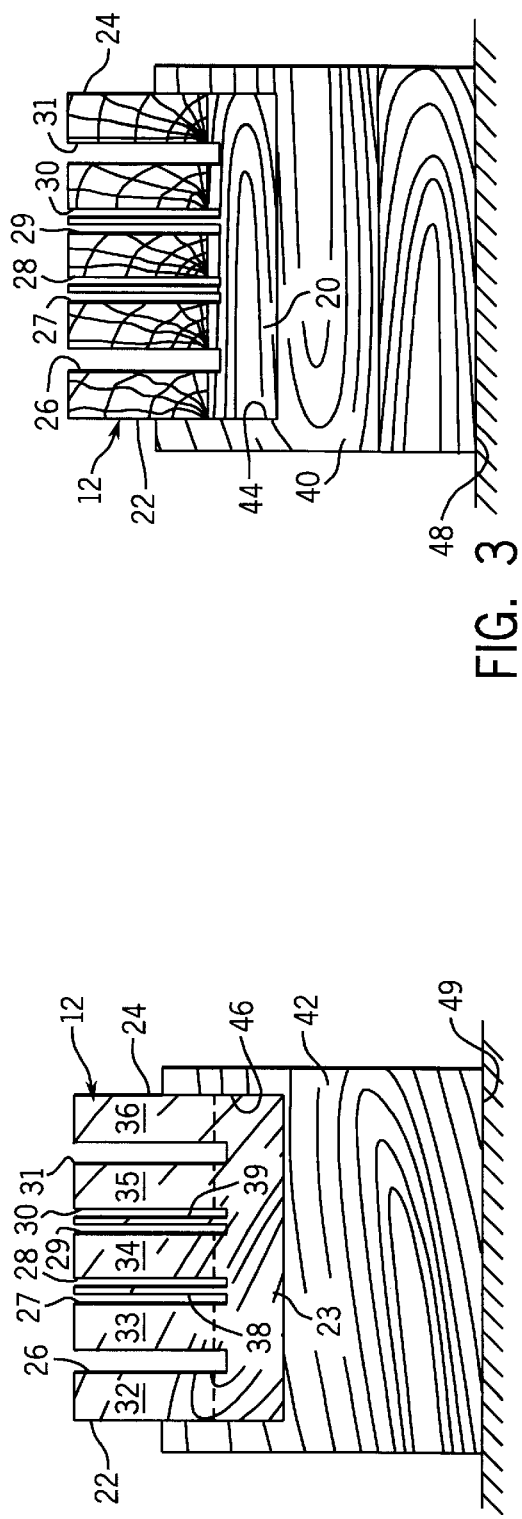

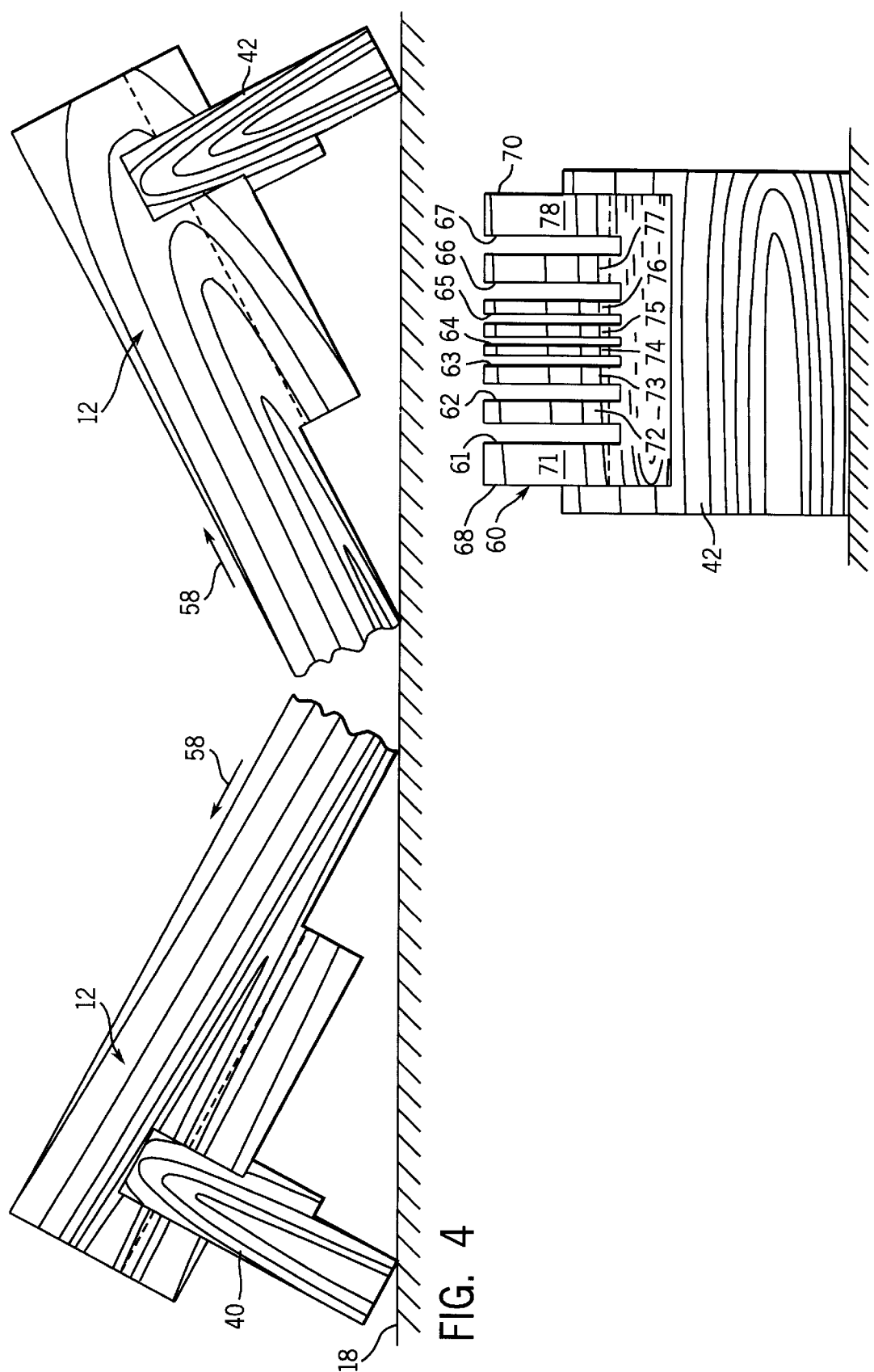

APPARATUS FOR STARTING A LOG FIRE

BACKGROUND OF THE INVENTION

The present invention relates to apparatus for igniting logs, such as logs stacked in a fireplace.

When building a fire in a fireplace, logs are usually stacked on andirons which support the ends of the logs above the hearth of the fireplace. This creates a space beneath the logs in which kindling or newspaper is placed. To start the fire, the person ignites the newspaper or kindling and the initial combustion creates heat and flames which cause the logs above to catch fire. When newspaper is used, a considerable amount must be placed beneath the logs as it is rapidly consumed in the initial stages of the fire. In addition, the large amount of newspaper does not provide a concentrated heat source but rather causes an initial fire in a substantial area beneath the logs.

It has been found that better ignition of the logs occurs by concentrating the initial fire from the kindling or newspapers. However, care must be taken in properly arranging the kindling or crumpled newspaper in order to achieve such a concentrated fire source.

SUMMARY OF THE INVENTION

A general object of the present invention is to provide an engineered kindling structure for starting combustion of logs.

Another object is to provide a fire source which initially provides a concentrated source of flame and heat to ignite logs placed adjacent to the source.

A further object of the present invention is to provide such a kindling structure which after an initial period of time distributes heat and flame over a larger area underneath the logs.

Yet another object of the present invention is to provide a fire starting mechanism having a height which can be adjusted for use with andirons of different heights.

These and other objects are satisfied by a manufactured fire starting apparatus which includes a body of combustible material, such as wood, that has first and second opposing major surfaces. A plurality of grooves extend in the first major surface along a first direction thereby forming a plurality of ribs in the body. In the preferred embodiment, the grooves extend between a first pair of opposing side walls of the body and are parallel to one another. A slot is provided in the second major surface running between a second pair of opposing side walls of the body in a transverse direction to the plurality of grooves. The slot is cut to a depth so that it communicates with the plurality of grooves to form air passages through the body. Preferably the slot is centrally located between the first pair of opposing side walls.

A support is provided to raise the apparatus body above the hearth upon which the fire is being built. In the preferred embodiment of the present invention, the second surface of the body is placed on top of a pair of blocks which are positioned on opposite sides of the slot. In this embodiment, the blocks have a notch in one edge within which the second surface of the body is received. Such an arrangement of the components raises the body to a first height above the hearth. By flipping the blocks over from this orientation and placing the body on top of the rotated blocks, the body can be raised to a greater height in order to accommodate andirons of different heights.

With the body resting on the blocks, a piece of paper or other readily combustible material can be placed between the blocks and under the slot in the body. Upon ignition, flames and heat from this material travel upward through the slot and the grooves in the body. This causes the side walls of the grooves in the body to ignite producing a concentrated source of flame and heat for the logs stacked above the fire starting apparatus. By the time that the central portion of the body has been consumed by the fire, the logs above will have commenced burning. Upon consumption of its central portion, the body collapses into an "M" shape beneath the logs. The burning of the body then progresses at an angle upward through the grooves distributing the flames and heat over a larger area beneath the logs increasing the burning area of the logs. This action provides a gradual, controlled ignition of the logs with very litte heat escaping past the sides or ends of the logs.

BRIEF DESCRIPTION OF THE DRAWINGS

FIG. 1 is a side view of the preferred embodiment of the present mechanism for starting log on fire;

FIG. 2 is an end view of the fire starting mechanism;

FIG. 3 is a cross-sectional view taken along line 3—3 of FIG. 1;

FIG. 4 is a side view of the fire starting mechanism at a time at which fire has consumed the central portion of the mechanism; and FIG. 5 is an end view of an alternative embodiment of the fire starting mechanism.

DETAILED DESCRIPTION OF THE INVENTION

With initial reference to FIGS. 1–3, a fire starting apparatus generally designated 10 comprises a body 12, of wood or similar combustible material. The body 12 has a first and second opposed major surface 14 and 16, which constitute upper and lower surfaces when positioned for use. The body also has four side walls 21, 22, 23 and 24 extending between the two major surfaces 14 and 16. For example, the rectangular body may be three inches wide, twelve inches long and two inches high.

A plurality of grooves 26–31 are formed in the first major surface 14 and extend between the opposite side walls 21 and 23. The grooves may be cut using a gang saw having a series of blades with thicknesses and spacings corresponding to the grooves, for example. The depth of the grooves 26–31 is approximately 75 percent of the distance between the first and second major surfaces 14 and 16. The number of grooves provided can vary. In addition the width of the grooves 26–31 may vary in order to regulate the intensity of the fire produced within the grooves by controlling the air available to consume the wooden side walls of each groove. The grooves form a plurality of relatively thick ribs 32, 33, 34, 35 and 36 in the upper portion of the body 12. Depending upon the burning characteristics of the particular type of wood of body 12, the central grooves may also include pairs of smaller grooves 27 and 28, and 29 and 30 with a very thin rib 38 and 39 therebetween, as shown in FIG. 3. The relatively small thickness of ribs 38 and 39, causes them to ignite before the larger outer ribs 26 and 31, thereby creating an initial burning that is centrally concentrated in the body, as will be described.

A slot 20 is formed in the second major body surface 16 between opposing side walls 22 and 24 so as to extend orthogonally with respect to the direction of the plurality of grooves 26–31. The slot 20 is cut to a depth that is slightly greater than 25 percent of the distance between the two opposing major surfaces 14 and 16 thereby communicating with the plurality of grooves 26–31 as shown in FIG. 3. This communication between the slot 20 and the plurality of grooves 26–31 provides passages for combustion air to flow upward through the body 12.

FIG. 5 illustrates an alternative version of the body 60 in which the width of the grooves 61–66 decreases going inward from the opposing sides 68 and 70. Correspondingly, the widths of the ribs 71–78 formed between the grooves 61–67 also decrease going inward from the opposing sides 68 and 70. As will be described, the relatively thin ribs 74, 75 and 76 in the central region of the body 60 ignite faster and before the larger outer ribs 71 and 78. This concentrates the initial combustion into the central portion of the wood body 60.

Referring again to FIGS. 1–3, the fire starting apparatus 10 is supported above a hearth surface 18 by two support blocks 40 and 42 which are beneath the second major surface 16 of the body 12 on opposite sides of the slot 20. It should be understood that the fire starting mechanism 10 can be provided to the user in an unassembled state and prior to use the user places the body 12 on each of the support blocks 40 and 42. As shown in FIGS. 2 and 3, each of the support blocks 40 and 42 has a notch 44 or 46, respectively, within which the body 12 is received. The support blocks 40 and 42 raise the body 12 above the hearth surface 18 so that the upper major surface 14 is closely spaced (approximately 1½ inches for example) from the underside of the logs (not shown) which are stacked on andirons above the fire starting mechanism 10 on the hearth surface 18. In order to accommodate andirons of different heights, the support blocks 40 and 42 can be inverted with the notches 44 and 46 facing the hearth surface 18. In this orientation, the opposite ends 48 and 49 of the support blocks contact with the bottom, or second surface 16 of the body 12 so as to raise the body higher off of the hearth surface 18.

As shown in FIG. 1, a pair of identical kindling blocks 50 and 51 can be placed on the hearth surface 18, or raised slightly thereabove by a plate 52, beneath the slot 20 in the body 12. Each of the kindling blocks 50 and 51 has a plurality of horizontally extending ribs 54 which face each other and provide relatively thin pieces of wood with large surface areas which readily ignite to produce ignition of the ribs 26–31 on body 12, as will be described.

Although the present invention is being described in the context of igniting logs supported by andirons in a fireplace having a hearth surface, the present invention also may be utilized to ignite logs and other materials in different settings, such as for a campfire.

In order to ignite logs supported by andirons in a fireplace, the fire staring apparatus 10 as shown in FIG. 1 is placed beneath the logs. A ball of paper, such as a napkin, or other combustible material is placed under the slot 20 and between the pair of kindling blocks 50 and 51, if those optional blocks are used. The paper ball 56 then is ignited with a match or a lighter and begins burning. The heat and flames from the paper ball 56 cause the tips of the horizontally extending ribs 54 on the kindling blocks 50 and 51 to commence burning. Although it is preferred to use the kindling blocks 50 and 51, it is possible to eliminate them and use a larger ball 56 of paper beneath the slot 20. As the kindling blocks 50 and 51 begin burning, the flames and heat flow upward into the slot 20 and through the central portion of the plurality of grooves 26–31 in the wood body. Combustion air is drawn under the body 12 and flows upward through the slots and this central portion of the plurality of grooves. The fire grows rapidly creating a bed of flames the width of the body 12 and the size of the region of communication between the slot 20 and the transversely extending grooves 26–31.

The close spacing between the kindling blocks 50 and 51 concentrates the flames and heat which radiate upward through the body 12 in a relatively small area. This action causes the relatively small ribs 38 and 39 of the block 12 to ignite which aid in transferring the combustion to the adjacent larger ribs 33, 34 and 35. The conflagration progresses so that all of the ribs 32–39 of the body 12 ignite.

The slot 20 confines the fire to the central portion of the starter apparatus 10 thereby concentrating heat and flames into a relatively small area under the logs and restricts the heat from escaping around the sides of the logs pile. Very little burning takes place at the front and rear side surfaces 22 and 24 of the body 12 until the interior of the slot 20 has widened significantly.

As the burning progresses, the intensity spreads outward in both directions from the center toward the various side walls 21–24 of the body 12. Eventually, the central portion of the body 12 burns through which divides the body 12 in two causing the central portion to drop downward onto the hearth surface 18 and the remnants of the kindling blocks 50 and 51, as shown in FIG. 4. Thereafter, the grooves 26–31 channel the combustion exhaust gases along directions indicated by arrows 58 upward through the divided sections of the body 12 which distributes the heat and flames over a greater portion of the body spreading the fire. This spreading of the fire also distributes the flames and heat over a larger area beneath the logs stacked above thereby widening the conflagration of the logs.

Therefore, the present fire starting apparatus 10 initially provides a concentrated ignition source to commence burning of the log pile and thereafter provides a controlled spreading of the flames to enlarge the combustion of the log pile.

The foregoing description is directed primarily to preferred embodiments of the invention. Although some attention was given to various alternatives within the scope of the invention, it is anticipated that skilled artisans will likely realize additional alternatives that are now apparent from the disclosure of those embodiments. Accordingly, the scope of the invention should be determined from the following claims and not limited by the above disclosure.

What is claimed is:

1. An article of manufacture for starting a fire, said article of manufacture comprising:

a single piece body of combustible material having first and second major surfaces opposite to one another, a plurality of side surfaces extending between the first and second major surfaces, a plurality of grooves extending across the first major surface along a first direction to form a plurality of ribs in the body, each one of the plurality of grooves having first and second end sections separated by a central section which communicates with a slot extending in the second major surface along a second direction that is transverse to the first direction wherein the slot communicates with plurality of grooves thereby forming passages for air to flow through the body between the first and second major surfaces; and a support for holding the body above a support surface.

2. The article of manufacture as recited in claim 1 wherein the support comprises a pair of legs for resting on the support surface, and upon which pair of legs the body rests.

3. The article of manufacture as recited in claim 1 wherein the support comprises a pair of blocks for resting on the support surface, and the pair of blocks extending along a second direction that is transverse to the first direction with the pair of blocks in contact with the second major surface.

4. The article of manufacture as recited in claim 3 wherein the opening in the second major surface of the body is formed by a slot extending in the second major surface along a second direction that is transverse to the first direction, the slot communicates with plurality of grooves and is located between the pair of blocks.

5. The article of manufacture as recited in claim 3 wherein each one of the pair of blocks has a notch therein for receiving the body.

6. The article of manufacture as recited in claim 1 further comprising a kindling block placed under the slot in the body and having a surface with a plurality of notches.

7. The article of manufacture as recited in claim 1 wherein one of the plurality of grooves near a center of the body is narrower than one of the plurality of grooves that is remote from the center of the body.

8. The article of manufacture as recited in claim 1 wherein one of the plurality of ribs near a center of the body is narrower than one of the plurality of ribs that is remote from the center of the body.

9. An article of manufacture for starting a fire, said article of manufacture comprising:

a body of wood having first and second major surfaces and first, second, third and fourth side surfaces extending between the first and second major surfaces, the body having a plurality of grooves in the first major surface and extending between the first and second side surfaces, the body also having a slot in the second major surface and extending between the third and fourth side surfaces, wherein the slot communicates with plurality of grooves to form air passages through the body; and a first block and a second block in contact with the second major surface to support the body.

10. The article of manufacture as recited in claim 9 wherein the first block contacts the second major surface on an opposite side of the slot from the second block.

11. The article of manufacture as recited in claim 9 wherein the first block and the second block each have a notch for receiving the body.

12. The article of manufacture as recited in claim 9 further comprising a kindling block placed under the slot in the body and having a surface with a plurality of notches.

13. The article of manufacture as recited in claim 9 further comprising a first kindling block placed under the slot in the body and having a first vertical surface with a plurality of ribs; and a second kindling block placed under the slot in the body and having a second vertical surface with a plurality of ribs, wherein the first vertical surface faces the second vertical surface.

14. The article of manufacture as recited in claim 9 wherein one of the plurality of grooves adjacent to the third and fourth side surfaces is wider than on of the plurality of grooves that is remote from the third and fourth side surfaces.

15. The article of manufacture as recited in claim 9 wherein the body has a plurality of ribs with each one formed between adjacent ones of the plurality of grooves and wherein one of the plurality of ribs adjacent to the third and fourth sides is wider than one of the plurality of ribs that is remote from the third and fourth sides.

* * * * *